United States Patent [19]

Takeuchi et al.

[11] Patent Number: 4,861,254

[45] Date of Patent: Aug. 29, 1989

[54] CASSETTE-TYPE MOLDING DIE

[75] Inventors: Hiroshi Takeuchi; Yoshiaki Takeuchi, both of Tokyo, Japan

[73] Assignee: Shinkoh Sellbic Co., Ltd., Tokyo, Japan

[21] Appl. No.: 163,113

[22] Filed: Mar. 2, 1988

[30] Foreign Application Priority Data

Apr. 16, 1987 [JP] Japan .................................. 62-56632
Aug. 17, 1987 [JP] Japan .................................. 62-125022

[51] Int. Cl.⁴ .............................................. B29C 45/66
[52] U.S. Cl. .................................... 425/190; 249/102; 425/589; 425/595
[58] Field of Search ............... 425/185, 188, 190, 536, 425/574, 575, 589, 595; 249/102, 103, 104

[56] References Cited

U.S. PATENT DOCUMENTS 4,202,522 5/1980 Hanas et al. ..................... 425/185

FOREIGN PATENT DOCUMENTS 57-6738 1/1982 Japan .
59-174331 10/1984 Japan .
60-116420 6/1985 Japan .
61-53213 11/1986 Japan .

*Primary Examiner*—Jay H. Woo
*Assistant Examiner*—Timothy W. Heitbrink
*Attorney, Agent, or Firm*—Wenderoth, Lind & Ponack

[57] ABSTRACT

A cassette-type molding die comprises a die plate unit having fitting bores and a cassette die unit including movable and stationary cassette plates between which a molding cavity is defined, an ejector cassette plate, and ejector pins disposed between the movable cassette plate and the ejector cassette plate. The cassette die unit can be detachably inserted into the fitting bores of the die plate unit. As a result, the cassette die unit can be easily exchanged with another cassette die unit while the movable and stationary die plates of the die plate unit are very close together. This speeds up the process of changing cassette die units, and also allows for the overall cassette-type molding die to be smaller than conventional units.

3 Claims, 6 Drawing Sheets

CASSETTE-TYPE MOLDING DIE

BACKGROUND OF THE INVENTION

1. Field of the Invention

This invention relates to a molding die for injection molding resin materials or the like. More particularly, this invention relates to a cassette-type molding die including a die plate unit having one or more cassette fitting bores and a cassette die unit capable of being detachably inserted into the fitting bores of the die plate unit.

2. Description of the Prior Art

In the field of resin molding, there has been cherished the idea such that only a core and a cavity which are essential elements in a molding die system are designed to be separated from a molding die frame and detachably incorporated in the molding die frame like a cassette Specifically, from a consideration of a current tendency to produce various kinds of molded products in a small quantity, such a conventional molding die system has entailed problems such as difficulty in changing the molding die with another molding die. Furthermore, the work for designing and producing the desired molding die requires much time and labor and is disadvantageous from the standpoint of cost.

In order to eliminate the problems described above, there have been proposed various molding dies of a cassette type.

In Japanese Patent Application Public Disclosure SHO No. 57-6738, a technical idea of fitting an exchangeable cassette die between a stationary die plate and a movable die plate is disclosed. Japanese Patent Publication Gazette SHO No. 61-53213 and Japanese Patent Application Public Disclosure SHO No. 60-116420 each describe a molding die structure in which stationary and movable die plates are provided in their opposed parting face portions with fitting bores for allowing cassette die halves to be inserted therein from the fronts of the respective parting faces. Also, Japanese Patent Application Public Disclosure SHO No. 59-174331 teaches a molding die device in which a separate cassette die can be detachably inserted into a molding die unit through the upper opening formed in the molding die unit.

However, in order to fit the cassette die halves into the fitting bores formed in the stationary and movable die plates from the fronts of the parting faces of the die plates as taught by the aforementioned Japanese Patent Publication Gazette SHO No. 61-53213 and Japanese Patent Application Public Disclosure SHO No. 60-116420, the die plates must be opened wider compared with the case of normal mold opening. Therefore, the work for exchanging the cassette die consumes much time and labor. Specifically, in case that a required molded product is large in height, it is necessary to open the die plates more widely. Thus, these facts prove to counterbalance the advantage of the cassette-type molding die.

The aforementioned shortcoming of the conventional cassette-type molding die will be remedied by adopting a molding die structure as proposed by Japanese Patent Application Public Disclosure SHO No. 59-174331. However, in this prior art structure, when one of the cassette die halves is fitted in the movable die plate, it is difficult to insert the separate movable cassette plate, ejector plate ejector pins in the movable die plate at a time, whereas the prior art makes no mention of means for effecting the work of fitting the separate elements into the die plate at a time.

OBJECT AND SUMMARY OF THE INVENTION:

In view of the above, an object of this invention is to provide a cassette-type molding die having a structure capable of uniting elements constituting a movable die in one body.

To attain the above object, a cassette-type molding die for molding resin materials according to the present invention comprises a movable cassette die including a movable cassette plate, an ejector cassette plate and ejector pins disposed between the movable cassette plate and the ejector plate, which are united in one body, a movable die plate and an ejector plate, which movable die plate and ejector plate defines fitting bores each formed in a substantially U-shape so as to detachably receive the movable cassette die within the bores through the upper openings of the bores.

The combined movable cassette plate, ejector cassette plate and ejector pins constituting the movable cassette die can be inserted into the fitting bores of the movable die plate and and ejector plate through the upper openings of the fitting bores. The movable cassette die fitted within the fitting bore of the movable die plate can easily be detached and replaced by another cassette die.

BRIEF DESCRIPTION OF THE DRAWINGS

A more complete appreciation of the invention and many of the attendent advantages thereof will be readily obtained as the same becomes better understood by reference to the following detailed description when considered in connection with the accompanying drawings, wherein.

DESCRIPTION OF THE PREFERRED EMBODIMENTS

Figure 1:
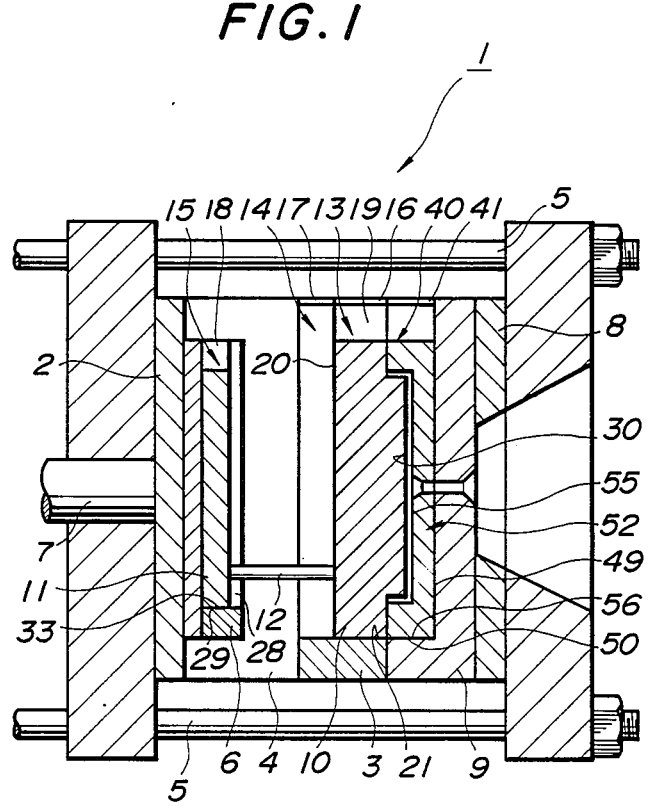
FIG. 1 is a vertical cross-sectional view illustrating one preferred embodiment of a cassette-type molding die in its assembled state according to this invention.
Figure 2:
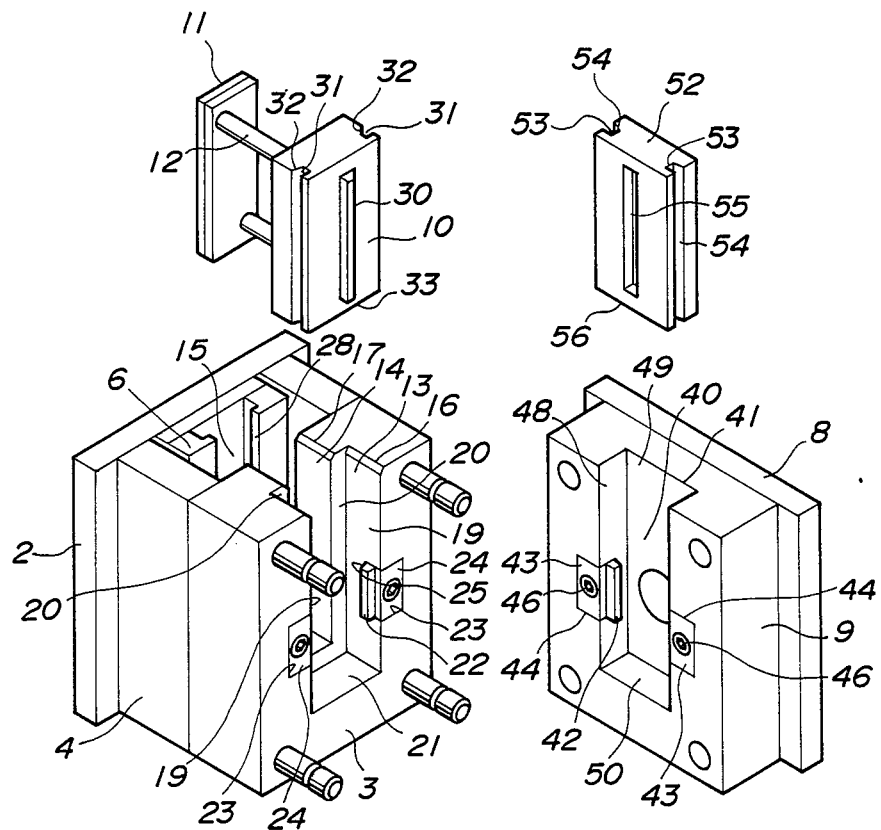
FIG. 2 is a perspective view of the molding die of FIG. 1 in its disassembled state.
Figure 3:
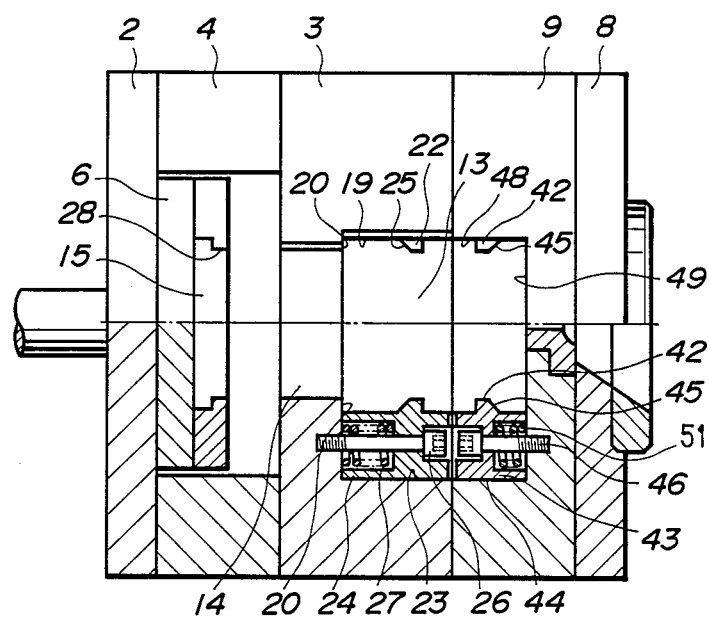
FIG. 3 is a horizontal cross-sectional view of the molding die of FIG. 1.

FIGS. 1 through 3 illustrate one preferred embodiment of the cassette-type molding die for resin molding according to this invention.

In the drawings, reference numeral 1 denotes a resin molding die, 2 a movable-side retaining plate, and 3 a movable die plate. The movable die plate 3 is attached to the retaining plate 2 through spacer blocks 4 and guided slidably by tie bars 5 so that it can move backward and forward along the tie bars 5. Between the opposed spacer blocks 4, an ejector plate 6 is disposed and moved backward and forward by means of a rod 7. A stationary-side retaining plate 8 is provided with a stationary die plate 9.

Between the movable die plate 3 and the ejector plate 6, there are formed fitting bores 13, 14 and 15 for detachably receiving a movable cassette plate 10, an ejector cassette plate 11 and one or more ejector pins 12 disposed between the plates 10 and 11. The fitting bores 13 to 15 have upper openings 16, 17 and 18 and substantially U-shaped or rectangular as a whole.

To be more specific, the movable die plate 3 connected to the movable retaining plate 2 through the spacer blocks 4 has a parting face at the front thereof. The fitting bore 13 on the parting face side in the movable die plate 3 is wider than the fitting bore 14 on the spacer block side. On the inner lateral surfaces 19 of the fitting bore 13, there are formed projecting members 22 which serve as pressure means. The rear surface 20 of the bore 13 are formed in a stepped state. The projecting members 22 are formed on a pressing seat member 24 which is fitted into dents 23 formed in the parting face and the inner lateral surface of the fitting bore 13. It is preferable that rear surfaces 25 of the projecting members 22 should be slantingly formed. Each pressure seat member 24 is located in the substantially middle portion between the upper end and the bottom of the fitting bore 13. The members 24 are each detachably fixed onto the rear surfaces 25 of the dents 23 by bolts 26 in such a state that they are biased forward by springs 27.

The fitting bore 15 formed in the ejector plate 6 is defined by a restraining structure comprising hook members 28 for retaining in position the ejector cassette plate 11 to be set inside the bore 15. The spacer blocks 4 are opposed to each other to form an upper opening.

The aforementioned movable cassette plate 10 has a molding core face 30 and is provided in the both side surfaces thereof with grooves 31 so as to come in engagement with the projecting members 22 formed on the inner lateral surfaces of the fitting bore 13. A rear surface 32 of the groove 31 is formed slantingly in conformity with the slant rear surface 22 of the pressure seat member 24. The movable cassette plate 10 is integrated with the ejector cassette plate 11 and the ejector pins 12 extending forward from the ejector cassette plate 11. The combined movable cassette plate 10, ejector cassette plate 11, and ejector pins 12 can readily be set in position in the fitting bores 16, 17, 18 only by being placed in the upper openings of the bores 16–18. When the combined plates 10, 11 and pins 12 are put onto the upper openings of the bores 16–18, they can easily fall into the bores with its own weight with the help of light depressing force while guiding the grooves 31 with the projecting members 22 and the ejector cassette plate 11 with the bore 15. Under the state in which lower end faces 33 of the movable cassette plate 10 and ejector cassette plate 11 come in contact with bottom walls 21, 29 of the fitting bores 13 and 15, the movable cassette plate 10 is retained in position by the inner lateral surfaces 19, rear surfaces 20 and bottom wall 21.

At the time, the ejector pins 12 are apart from the inner surfaces of the bore 14 and the spacer blocks 4.

Thus, the combined plates 10, 11 and pins 12 can be readily replaced by another cassette die.

Similarly, a stationary cassette plate 52 can be exchanged. The stationary die plate 9 for retaining the stationary cassette plate 52 is provided with a fitting bore 40 having an upper opening 41. Within the fitting bore 40, there are formed pressure seat members 43 which are embedded in dents 44 formed in opposite inner lateral walls 48 and provided on their opposite inner surfaces with projecting members 42. The pressure seat member 43 in the dent 44 is fixed by a bolt 46.

The projecting member 42 on the pressure seat member 43 may be provided with an inclined face 45. In the drawings, reference numeral 48 denotes an innermost wall surface, 50 a bottom surface, and 51 springs.

The stationary cassette plate 52 to be held in the fitting bore 40 of the stationary die plate 9 is formed in a substantially rectangular shape and provided in the side edge surfaces with vertical grooves 53. When the stationary cassette plate 52 is inserted into the fitting bore 40 through the upper opening 41, it is guided by the projecting members 42 which is in engagement with the grooves 53. With this structure, the stationary cassette plate 52 can readily be set in position into the fitting bore 40 of the stationary die plate 9. In the drawings, reference numeral 54 denotes an inclined surface of the groove 53, 55 a molding cavity, and 56 a lower surface of the stationary die plate 52.

In the structure described above as one example, since the pressure seat members 24 are biased forwardly by the springs 27 so as to be elastically supported in a floating state, the movable cassette plate 10 which is placed within the bore 13 is elastically retained there without wobbling and can be readily removed from the movable die plate 3. Besides, the movable cassette plate 10 can be firmly fixed in the bore 13 by tightening the bolts 26 as required. Given that the rear surfaces 25 and 32 of the projecting members 22 and the grooves 31 are slantingly formed, the engaging force produced between the opposed rear surfaces 25 and 32 can be adjusted by controlling the bolts 26. Namely, the retaining condition of the movable cassette plate 10 in the bore 13 can be freely changed.

Figure 4:
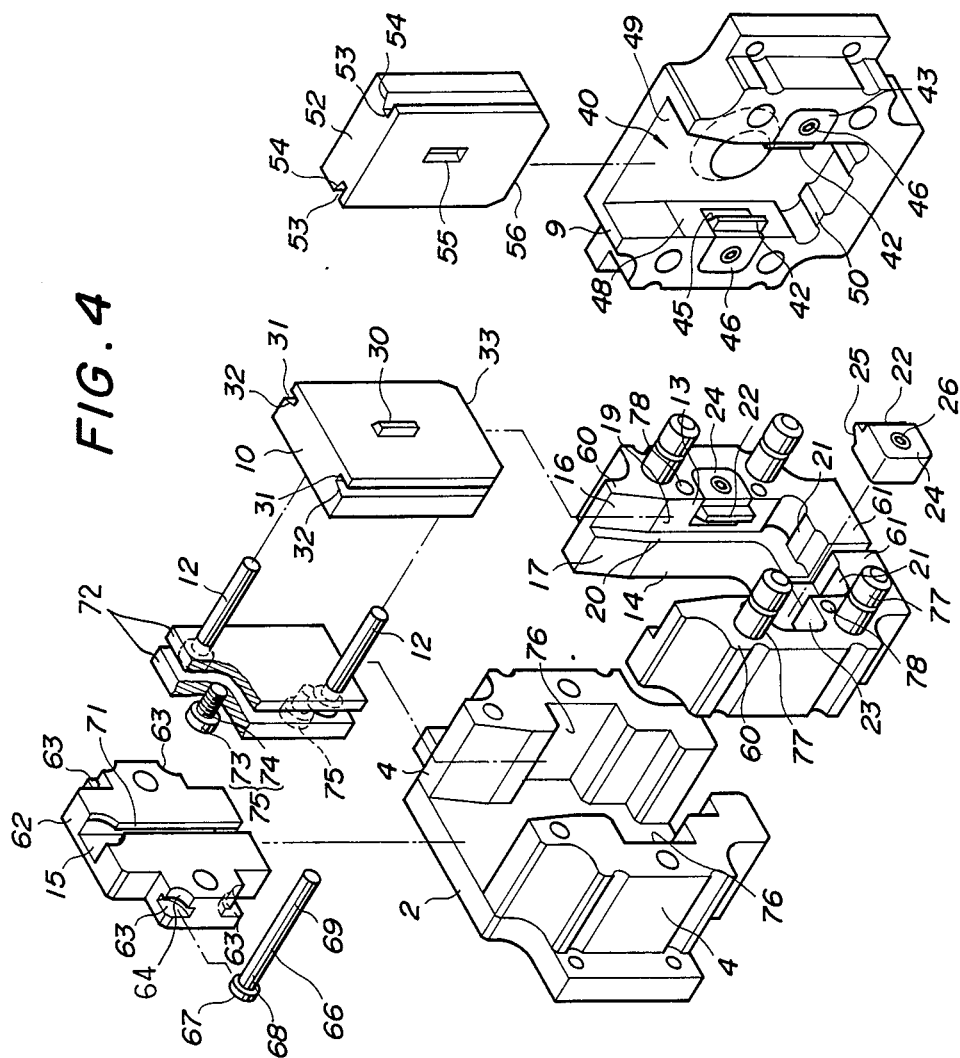
FIG. 4 is an exploded perspective view of another preferred embodiment of the molding die according to this invention.
Figure 5:
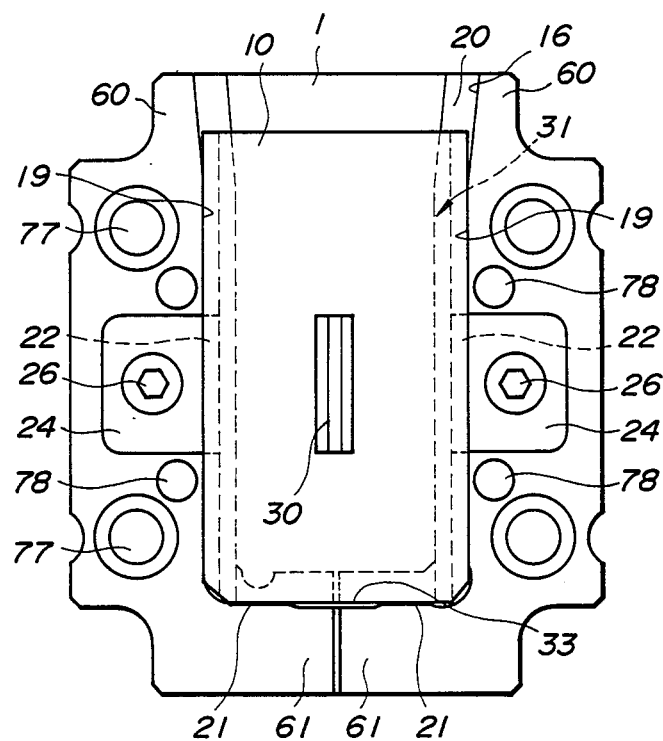
FIG. 5 is a front view of the movable die plate of the molding die embodiment of FIG. 4.
Figure 6:
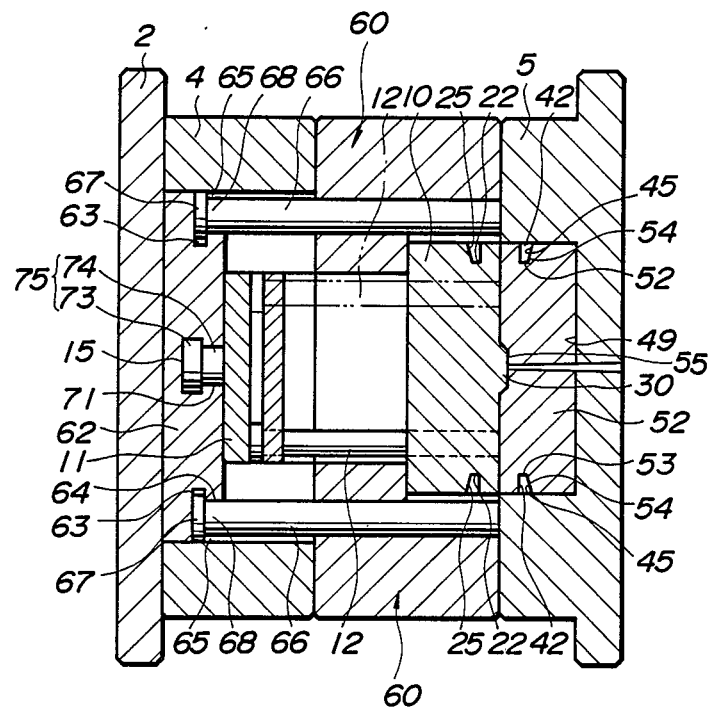
FIG. 6 is a horizontal cross-sectional view of the molding die of FIG. 4.

Shown in FIGS. 4 through 6 is another preferred embodiment of this invention. Most elements indicated by like reference symbols with respect to those of the first embodiment have analogous structures and functions to those of the first embodiment and will not be described in detail again.

In this embodiment, the movable die plate comprises a pair of die plate halves 60 each formed in the shape of a substantially L. Bottom portions 61 of the die plate halves 60 are small in projected area viewed from the front.

An ejector plate 62 is provided in the four corner portions thereof with receiving grooves 63 which open forward. The depth of the groove 63 is half or less as large as the thickness of the ejector plate 62. Each groove 63 is provided on the front portion thereof with a catch member 64. When the ejector plate 62 is inserted inside the movable die plate comprising the die plate halves 60 in such a state that return pins 66 are in engagement with the receiving grooves 63, there are formed relief gaps 65 between the respective return pins 66 and the die plate halves 60. In the drawings, reference numeral 67 denotes a flange portion of the return pin 66, and 78 a through hole bored in the die plate half 60 for passing the return pin 66.

Furthermore, in the ejector plate 62, there is formed a trap groove 15 with stepped lug members 71 for preventing an engaging member 75, when inserted into the groove 15, from being out of place. The engaging members 75 are disposed on the rear surface of the movable die plate 72 and each comprise a shank 73 and a head 74. In the drawings, reference numeral 76 denotes a fitting bore defined between the spacer blocks 4, and 77 a guide pin.

The cassette die constituted by the elements noted above is assembled in the following manner. When the flange portions 67 of the return pins 66 are brought into engagement with the receiving grooves 63 of the ejector plate 62, the flange portions 67 are trapped by the catch members 64 to thereby preventing the return pins 66 from moving in the axial direction thereof. At the same time, the shank potions 68 of the return pins 66 rest on the catch members 64. As a result, the ejector plate 62 and the movable die plate 72 are united with each other. Next, the die plate halves 60 constituting the movable die plate are united to the ejector plate 62 by allowing the return pins 66 extending forward from the ejector plate 62 to be inserted into the through holes 78 bored in the die plate halves 78. Then, the die plate halves 60 which are opposite to each other to form a substantial U-shaped configuration are fixed to the movable retaining plate 2 through the spacer blocks 4.

Thereafter, the movable cassette plate 10 is fitted into the fitting bore 13 in the manner described early. That is, the engaging member 75 disposed on the movable cassette plate 10 is put into the trap groove 15. Given that the head 27 of the engaging member 75 is held by the stepped lug members 71, the cassette plate 10 is in no way released forwardly from the ejector plate 62.

According to this embodiment, as pressure which is produced in a molding operation and exerted on the die plate halves 60 is absorbed by the structure in which the die plate halves 60 are separated at the bottom portions 61 thereof, no deflection occurs in the die plate halves 60 and, consequently, the bottom portions 61 thereof can be reduced in projected area as viewed from the front. The cassette-type molding die as a whole can therefore be minimized to some extent. Thus, by dividing the movable die plate into two halves 60, the total projected area of the bottom portions 61 could be reduced to approximately half as large as that of the bottom portion 21 in the first embodiment.

Moreover, given that the movable die plate is divided into the die plate halves 60, the width of the space between the die plate halves 60 can be adjusted to meet that of each of the movable cassette plates 10 having different sizes.

Similarly to the die plate halves 60 of the movable die plate, the stationary die plate 9 may also be divided in two.

As is clear from the foregoing description, according to this invention, the movable-side cassette die comprising the combined movable cassette plate, ejector plate and ejector pins disposed between the plates can be detachably inserted into the fitting bore in the movable die plate through the upper opening of the bore. Consequently, the movable-side cassette die can be easily set in the movable die plate as the die is in the opening state. Accordingly, the cassette die can be speedily fitted in and removed from the die plate.

As described in detail above, the present invention provides an improved high-speed drill with excellent cutting property. Various modifications will become possible for those skilled in the art after receiving the teachings of the present disclosure without departing from the scope thereof.

What is claimed is:

1. A cassette-type molding die for molding resin materials, said molding die comprising:

a stationary die plate having a plurality of inner surfaces defining an upwardly open fitting bore;

attachment means in said upwardly open fitting bore for detachably receiving a stationary-side cassette plate inserted downwardly into said fitting bore, said attachment means including at least two spaced opposed seat members detachably embedded in said plurality of inner surfaces of said stationary die plate, a screw means for detachably securing each one of said at least two spaced opposed seat members, and a projecting member on each one of said at least two spaced opposed seat members for projecting into and engaging with a stationary-side cassette plate when a stationary-side cassette plate is detachably received in said upwardly open fitting bore of said stationary die plate;

a stationary-side cassette plate detachably received in said upwardly open fitting bore of said stationary die plate and detachably engaged by said projecting members of said at least two spaced opposed seat members;

a movable die plate spaced opposed to said stationary die plate, said movable die plate having a plurality of inner surfaces partially defining a substantially U-shaped upwardly open fitting bore;

a movable-side retaining plate partially defining said substantially U-shaped upwardly open fitting bore;

at least two spacer blocks disposed between said movable-side retaining plate and said movable die plate, said at least two spacer blocks further defining said substantially U-shaped upwardly open fitting bore;

attachment means in said upwardly open substantially U-shaped fitting bore for detachably receiving a movable-side cassette plate inserted downwardly into said U-shaped fitting bore, said attachment means including at least two spaced opposed seat members detachably embedded in said plurality of inner surfaces of aid movable die plate, a screw means for detachably securing each one of said at least two spaced opposed seat members, and a projecting member on each one of said at least two spaced opposed seat members for projecting into and engaging with a movable-side cassette plate when a movable-side cassette plate is detachably received in said upwardly open U-shaped fitting bore of said movable die plate;

an ejector plate;

at least one ejector pin attached to said ejector plate;

a movable-side cassette plate attached to said at least one ejector pin; and said ejector plate, said at least one ejector pin, and said movable-side cassette plate being detachably received in said substantially U-shaped upwardly open fitting bore, said ejector plate being adjacent to said at least two spacer blocks, and said movable-side cassette plate being adjacent to said movable die plate.

2. A device as in claim 1, wherein said substantially U-shaped upwardly open fitting bore of said movable die plate opens widely on a parting face side thereof.

3. A device as in claim 1, wherein said movable die plate includes two substantially L-shaped halves at the lower portion thereof.

* * * * *